(12) United States Patent
Burton et al.

(10) Patent No.: US 12,056,726 B2
(45) Date of Patent: Aug. 6, 2024

(54) RAPID REGION WIDE PRODUCTION FORECASTING

(71) Applicant: Schlumberger Technology Corporation, Sugar Land, TX (US)

(72) Inventors: Erik Burton, San Jose, CA (US); Andrey Konchenko, Menlo Park, CA (US); Emilien Dupont, Los Altos, CA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 386 days.

(21) Appl. No.: 17/310,185

(22) PCT Filed: Jan. 24, 2020

(86) PCT No.: PCT/US2020/014876
§ 371 (c)(1),
(2) Date: Jul. 23, 2021

(87) PCT Pub. No.: WO2020/154558
PCT Pub. Date: Jul. 30, 2020

(65) Prior Publication Data
US 2022/0092617 A1   Mar. 24, 2022

Related U.S. Application Data

(60) Provisional application No. 62/796,359, filed on Jan. 24, 2019.

(51) Int. Cl.
*G06Q 30/0202* (2023.01)
*G06N 20/00* (2019.01)
(Continued)

(52) U.S. Cl.
CPC ......... *G06Q 30/0202* (2013.01); *G06N 20/00* (2019.01); *G06Q 10/04* (2013.01); *G06Q 50/02* (2013.01); *E21B 2200/20* (2020.05)

(58) Field of Classification Search
CPC .... G06Q 30/0202; G06Q 10/04; G06Q 50/02; G06N 20/00; G06N 5/01; G06N 20/20; E21B 2200/20
See application file for complete search history.

(56) References Cited

U.S. PATENT DOCUMENTS 6,101,447 A     8/2000  Poe, Jr.
2010/0312536 A1  12/2010  Vaal et al.
(Continued)

OTHER PUBLICATIONS

Li, Yunan, and Yifu Han. "Decline curve analysis for production forecasting based on machine learning." SPE Symposium: Production Enhancement and Cost Optimisation. SPE, 2017. (Year: 2017).*
(Continued)

*Primary Examiner* — Yoshihisa Ishizuka
*Assistant Examiner* — Carter W Ferrell

(57) ABSTRACT

A method for rapid region wide production forecasting includes identifying base data of a well in a plurality of wells of a region; selecting, using the base data and from a set of a models comprising a rich machine learning model, a location based machine learning model, and a decline curve model, a well model; and generating, based on the selecting, a forecasted production of the well using the base data and the well model. The method further includes aggregating a plurality of forecasted productions of the plurality of wells, the plurality of forecasted productions including the forecasted production, to generate a region forecast using the rich machine learning model, the location based machine learning model, and the decline curve model; and presenting the region forecast.

20 Claims, 12 Drawing Sheets

Training Process 300

(51) Int. Cl.
*G06Q 10/04* (2023.01)
*G06Q 50/02* (2024.01)

(56) References Cited

U.S. PATENT DOCUMENTS

| | | |
|---|---|---|
| 2014/0297235 A1 | 10/2014 | Arora et al. |
| 2017/0364795 A1 | 12/2017 | Anderson et al. |
| 2018/0060454 A1* | 3/2018 | Bashore ................. E21B 41/00 |
| 2018/0202264 A1* | 7/2018 | Sarduy .................. G06N 20/00 |
| 2018/0335538 A1 | 11/2018 | Dupont et al. |
| 2019/0332960 A1* | 10/2019 | Zheng ..................... G06F 30/20 |
| 2019/0361146 A1* | 11/2019 | Roth ........................ G01V 1/50 |
| 2020/0184253 A1* | 6/2020 | Butscher ............... G06F 18/217 |

OTHER PUBLICATIONS

J.J. Arps, "Analysis of Decline Curves," Chapter II. Petroleum Economics, A.I.M.E., Houston Meeting, May 1944) pp. 228-247.
Li, Yunan et al., "Decline Curve Analysis for Production Forecasting Based on Machine Learning," Society of Petroleum Engineeers, SPE Symposium: Production Enhancement and Cost Optimisation, Nov. 2017, SPE 189205, 14 pages.
International Search Report and Written Opinion of International Patent Application No. PCT/US2020/014876, 9 pages.
Extended Search Report issued in European Patent Application No. 20745873.8 dated Aug. 23, 2022, 7 pages.
International Preliminary Report on Patentability of International Patent Application No. PCT/US2020/014876 dated Aug. 5, 2021, 8 pages.

* cited by examiner

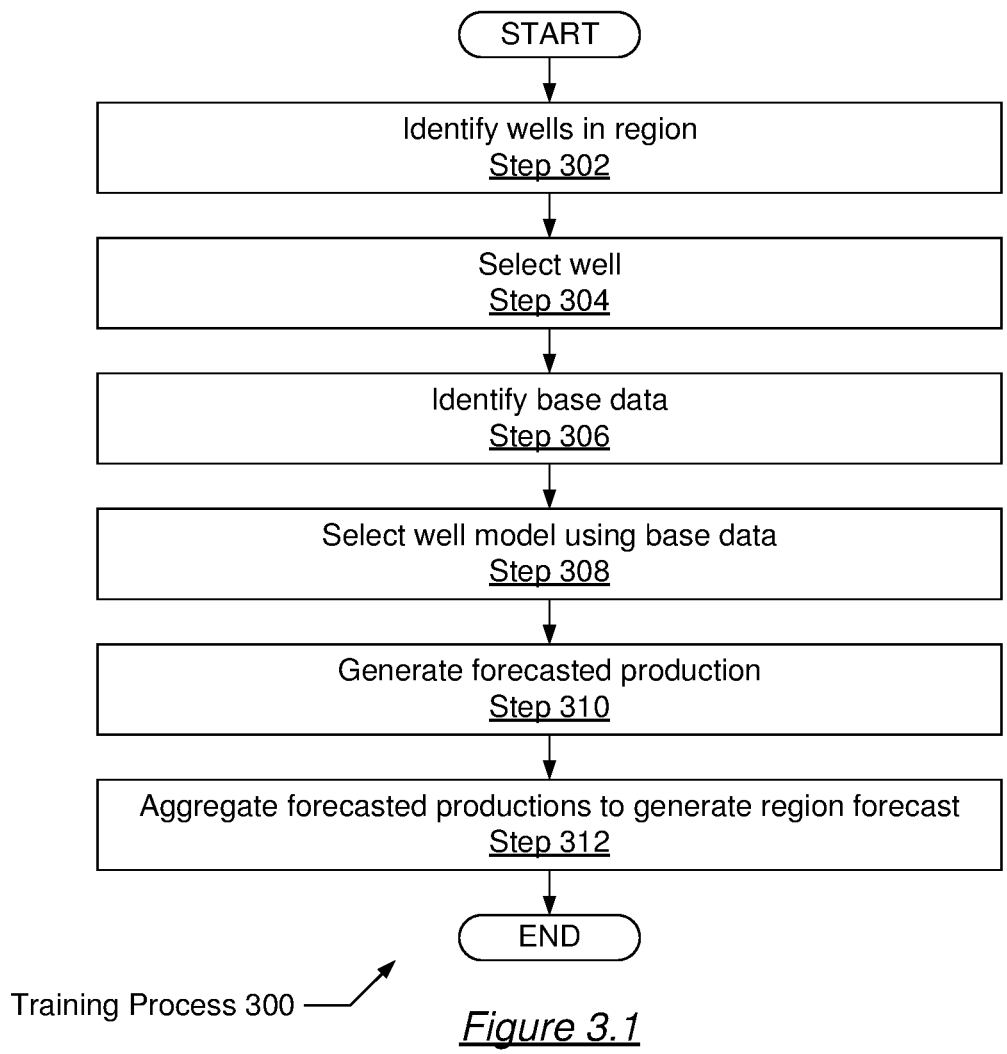
Figure 3.1

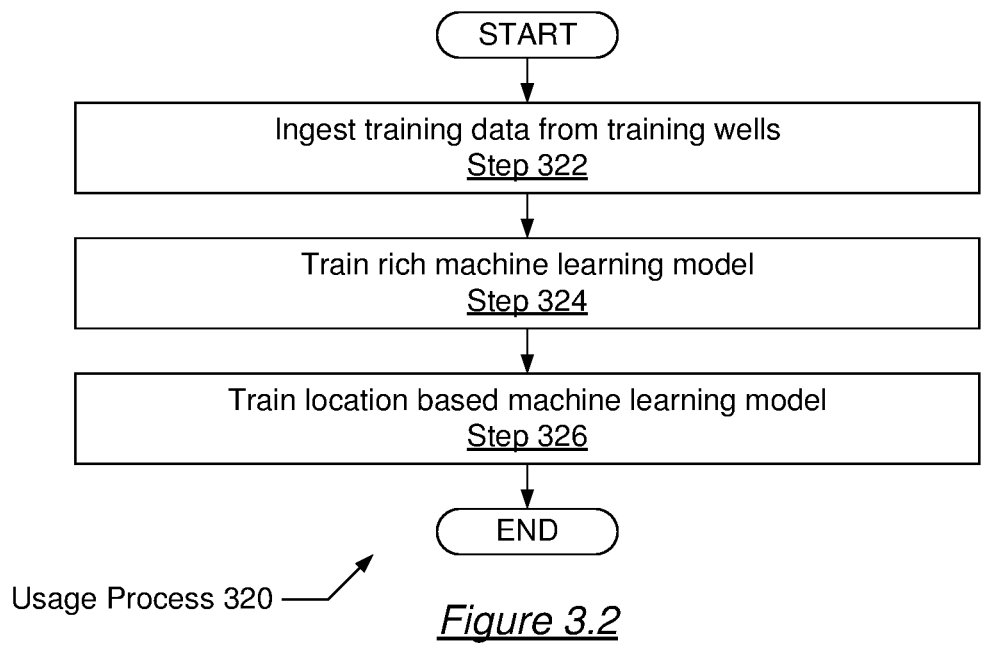
Figure 3.2

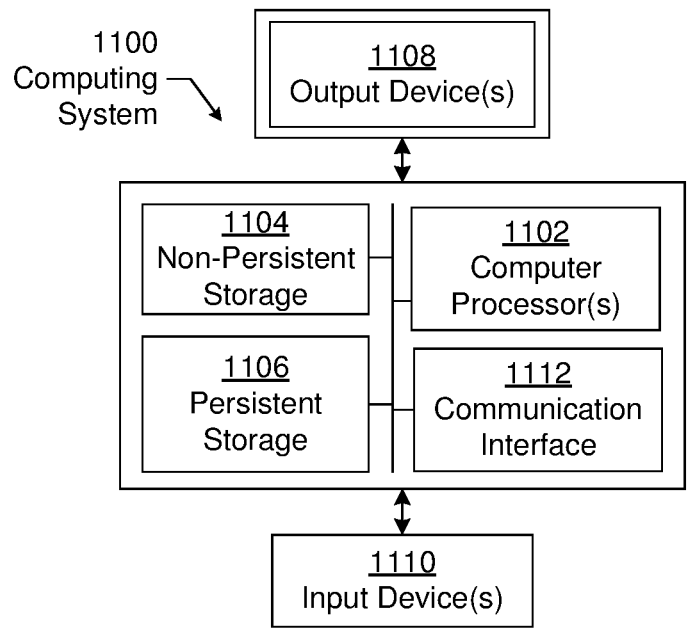
FIG. 11.1
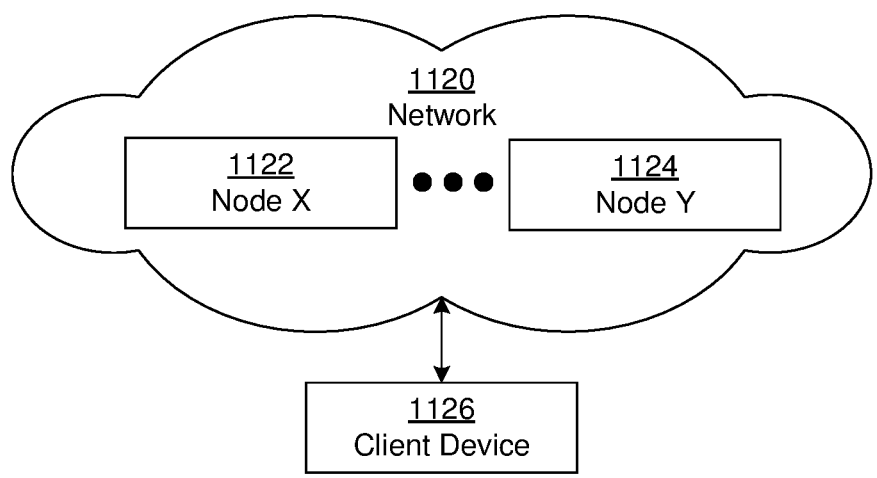
FIG. 11.2

RAPID REGION WIDE PRODUCTION FORECASTING

CROSS REFERENCE PARAGRAPH

This application claims the benefit of U.S. Provisional Application No. 62/796,359, entitled "RAPID BASIN WIDE PRODUCTION FORECASTING," filed Jan. 24, 2019, the disclosure of which is hereby incorporated herein by reference.

BACKGROUND

Basin forecasting technology generates forecasts for the production of wells of a basin. Computers rely on existing production data in order to generate a forecast. A challenge is building a computer with the capability to generate accurate production forecasts for basins that include wells with little or no production data.

SUMMARY

In general, in one or more aspects, the disclosure relates to a method that includes identifying base data of a well in a plurality of wells of a region; selecting, using the base data and from a set of a models comprising a rich machine learning model, a location based machine learning model, and a decline curve model, a well model; and generating, based on the selecting, a forecasted production of the well using the base data and the well model. The method further includes aggregating a plurality of forecasted productions of the plurality of wells, the plurality of forecasted productions including the forecasted production, to generate a region forecast using the rich machine learning model, the location based machine learning model, and the decline curve model; and presenting the region forecast.

Other aspects of the disclosure will be apparent from the following description and the appended claims.

BRIEF DESCRIPTION OF DRAWINGS

FIG. 3.1 and FIG. 3.2 show flowcharts in accordance with disclosed embodiments.

FIG. 11.1 and FIG. 11.2 show computing systems in accordance with disclosed embodiments.

DETAILED DESCRIPTION

Figure 1:
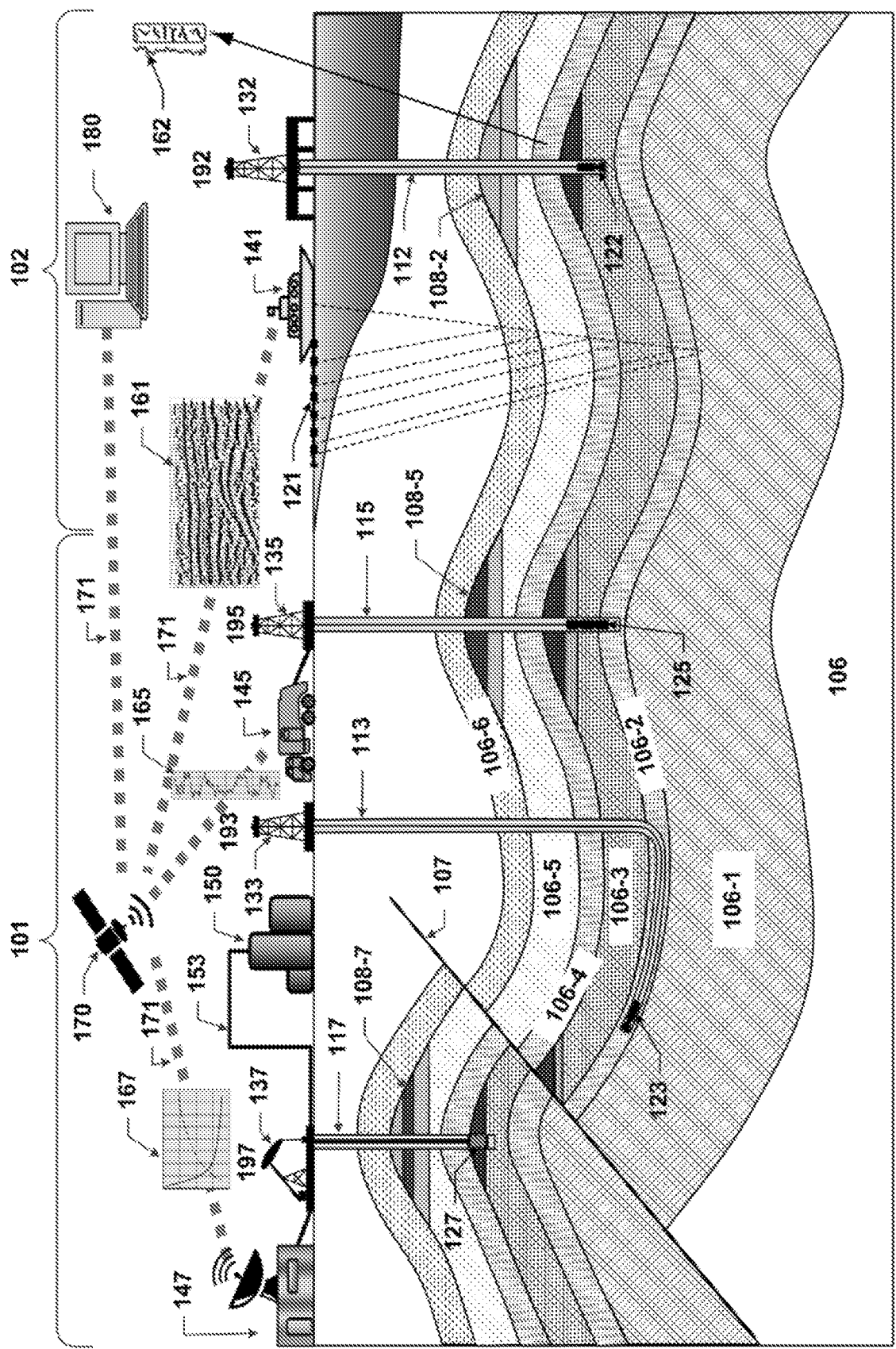
FIG. 1 shows a diagram of a system in accordance with disclosed embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosed embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments are directed to providing a fast estimate of the future production of an entire region having multiple wells (e.g., basin, field, or any other set of wells) for a predetermined time range (e.g., six months to a year into the future) with a region wide forecaster using an analysis engine. One or more embodiments provide the fast estimate by predicting production individually for each well of the multiple wells in the region, with different techniques depending on data availability. The region wide forecaster may be used in applications that include local field operations planning to supply estimation for financial estimates.

In general, the algorithm predicts production on two types of information: completed wells and future wells. The completed wells are drawn from an exploration and production database (also referred to a public production data). Public production data may not contain subsurface composition data but may include location data and some metadata. The wells are then divided into a first set of wells with 'rich' data sets, that is with lateral length and completion data, a second set of wells with initial production and location data, and a third set of wells with location information. In other words, 'rich' refers to having at least a threshold amount of data. The threshold amount may be having, at a minimum, lateral length and completion data. A separate machine learning algorithm is used for each of the first two types of data (e.g., first and second set of wells). The third set of wells with location information are treated as a 'future well' and treated separately (as the information available for those wells is the same as for future wells). The future wells are the wells from the database with location information, as well as drilled and uncompleted wells, and active leases which have not been drilled. The production of the future wells is predicted using a separate machine learning system that generates estimates from location information.

FIG. 1 depicts a schematic view, partially in cross section, of an onshore field (101) and an offshore field (102) in which one or more embodiments may be implemented. In one or more embodiments, one or more of the modules and elements shown in FIG. 1 may be omitted, repeated, and/or substituted. Accordingly, embodiments should not be considered limited to the specific arrangement of modules shown in FIG. 1.

As shown in FIG. 1, the fields (101), (102) include a geologic sedimentary basin (106), wellsite systems (192), (193), (195), (197), wellbores (112), (113), (115), (117), data acquisition tools (121), (123), (125), (127), surface units (141), (145), (147), well rigs (132), (133), (135), production equipment (137), surface storage tanks (150), production pipelines (153), and an exploration and production (E&P) computer system (180) connected to the data acquisition tools (121), (123), (125), (127), through communication links (171) managed by a communication relay (170).

The geologic sedimentary basin (106) contains subterranean formations. As shown in FIG. 1, the subterranean formations may include several geological layers (106-1 through 106-6). As shown, the formation may include a basement layer (106-1), one or more shale layers (106-2, 106-4, 106-6), a limestone layer (106-3), a sandstone layer (106-5), and any other geological layer. A fault plane (107) may extend through the formations. In particular, the geologic sedimentary basin includes rock formations and may include at least one reservoir including fluids, for example the sandstone layer (106-5). In one or more embodiments, the rock formations include at least one seal rock, for example, the shale layer (106-6), which may act as a top seal. In one or more embodiments, the rock formations may include at least one source rock, for example the shale layer (106-4), which may act as a hydrocarbon generation source. The geologic sedimentary basin (106) may further contain hydrocarbon or other fluids accumulations associated with certain features of the subsurface formations. For example, accumulations (108-2), (108-5), and (108-7) associated with structural high areas of the reservoir layer (106-5) and containing gas, oil, water or any combination of these fluids.

In one or more embodiments, data acquisition tools (121), (123), (125), and (127), are positioned at various locations along the field (101) or field (102) for collecting data from the subterranean formations of the geologic sedimentary basin (106), referred to as survey or logging operations. In particular, various data acquisition tools are adapted to measure the formation and detect the physical properties of the rocks, subsurface formations, fluids contained within the rock matrix and the geological structures of the formation. For example, data plots (161), (162), (165), and (167) are depicted along the fields (101) and (102) to demonstrate the data generated by the data acquisition tools. Specifically, the static data plot (161) is a seismic two-way response time. Static data plot (162) is core sample data measured from a core sample of any of subterranean formations (106-1 to 106-6). Static data plot (165) is a logging trace, referred to as a well log. Production decline curve or graph (167) is a dynamic data plot of the fluid flow rate over time. Other data may also be collected, such as historical data, analyst user inputs, economic information, and/or other measurement data and other parameters of interest.

The acquisition of data shown in FIG. 1 may be performed at various stages of planning a well. For example, during early exploration stages, seismic data (161) may be gathered from the surface to identify possible locations of hydrocarbons. The seismic data may be gathered using a seismic source that generates a controlled amount of seismic energy. In other words, the seismic source and corresponding sensors (121) are an example of a data acquisition tool. An example of seismic data acquisition tool is a seismic acquisition vessel (141) that generates and sends seismic waves below the surface of the earth. Sensors (121) and other equipment located at the field may include functionality to detect the resulting raw seismic signal and transmit raw seismic data to a surface unit (141). The resulting raw seismic data may include effects of seismic wave reflecting from the subterranean formations (106-1 to 106-6).

After gathering the seismic data and analyzing the seismic data, additional data acquisition tools may be employed to gather additional data. Data acquisition may be performed at various stages in the process. The data acquisition and corresponding analysis may be used to determine where and how to perform drilling, production, and completion operations to gather downhole hydrocarbons from the field. Generally, survey operations, wellbore operations and production operations are referred to as field operations of the field (101) or (102). These field operations may be performed as directed by the surface units (141), (145), (147). For example, the field operation equipment may be controlled by a field operation control signal that is sent from the surface unit.

Further as shown in FIG. 1, the fields (101) and (102) include one or more wellsite systems (192), (193), (195), and (197). A wellsite system is associated with a rig or a production equipment, a wellbore, and other wellsite equipment configured to perform wellbore operations, such as logging, drilling, fracturing, production, or other applicable operations. For example, the wellsite system (192) is associated with a rig (132), a wellbore (112), and drilling equipment to perform drilling operation (122). In one or more embodiments, a wellsite system may be connected to a production equipment. For example, the well system (197) is connected to the surface storage tank (150) through the fluids transport pipeline (153).

In one or more embodiments, the surface units (141), (145), and (147), are operatively coupled to the data acquisition tools (121), (123), (125), (127), and/or the wellsite systems (192), (193), (195), and (197). In particular, the surface unit is configured to send commands to the data acquisition tools and/or the wellsite systems and to receive data therefrom. In one or more embodiments, the surface units may be located at the wellsite system and/or remote locations. The surface units may be provided with computer facilities (e.g., an E&P computer system) for receiving, storing, processing, and/or analyzing data from the data acquisition tools, the wellsite systems, and/or other parts of the field (101) or (102). The surface unit may also be provided with, or have functionality for actuating, mechanisms of the wellsite system components. The surface unit may then send command signals to the wellsite system components in response to data received, stored, processed, and/or analyzed, for example, to control and/or optimize various field operations described above.

In one or more embodiments, the surface units (141), (145), and (147) are communicatively coupled to the E&P computer system (180) via the communication links (171). In one or more embodiments, the communication between the surface units and the E&P computer system may be managed through a communication relay (170). For example, a satellite, tower antenna or any other type of communication relay may be used to gather data from multiple surface units and transfer the data to a remote E&P computer system for further analysis. Generally, the E&P computer system is configured to analyze, model, control, optimize, or perform management tasks of the aforementioned field operations based on the data provided from the surface unit. In one or more embodiments, the E&P computer system (180) is provided with functionality for manipulating and analyzing the data, such as analyzing seismic data to determine locations of hydrocarbons in the geologic sedimentary basin (106) or performing simulation, planning, and optimization of exploration and production operations of the wellsite system. In one or more embodiments, the results generated by the E&P computer system may be displayed for user to view the results in a two-dimensional (2D) display, three-dimensional (3D) display, or other suitable displays. Although the surface units are shown as separate from the E&P computer system in FIG. 1, in other examples, the surface unit and the E&P computer system may also be combined. The E&P computer system and/or surface unit may correspond to a computing system, such as the computing system shown in FIGS. 11.1 and 11.2 and described below.

Figure 2:
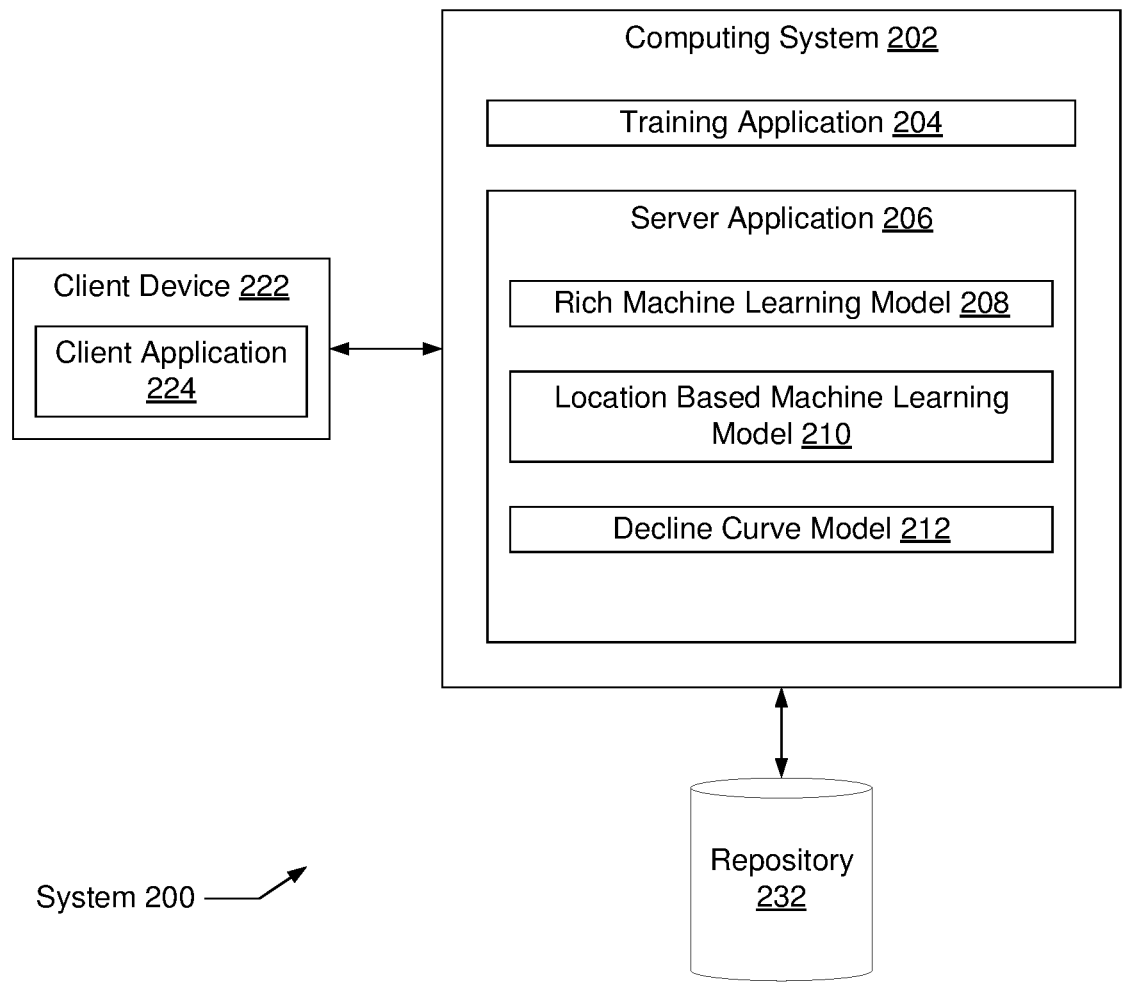
FIG. 2 shows a computing system in accordance with disclosed embodiments.
Figure 4:
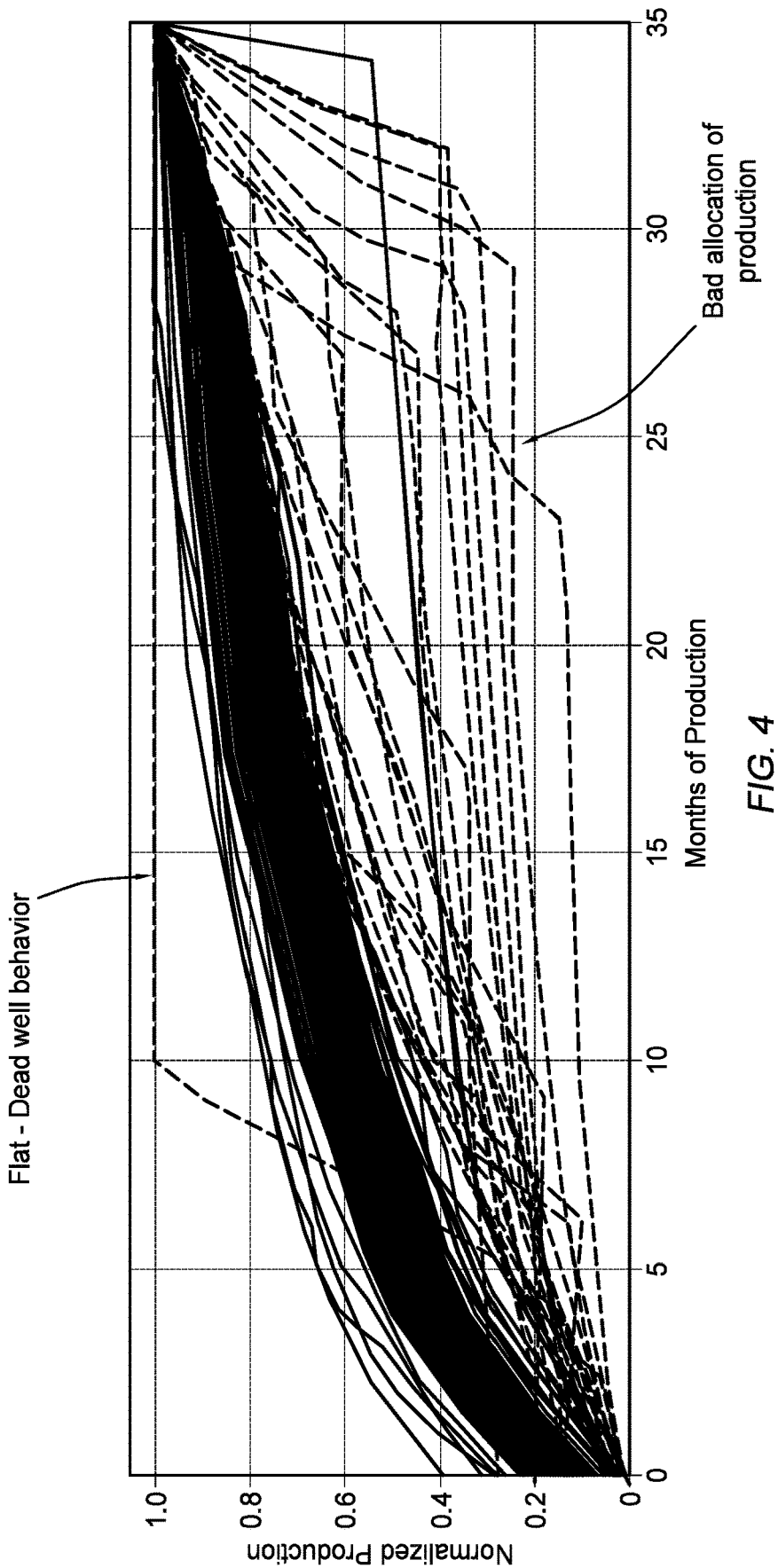
FIG. 4, FIG. 5, FIG. 6, FIG. 7, FIG. 8, FIG. 9, and FIG. 10 show examples in accordance with disclosed embodiments.

FIG. 2 shows a diagram of embodiments that are in accordance with the disclosure. The embodiments of FIG. 2 may be combined and may include or be included within the features and embodiments described in the other figures of the application. The features and elements of FIG. 2 are, individually and as a combination, improvements to technology that includes machine learning models. The various elements, systems, and components shown in FIG. 2 may be omitted, repeated, combined, and/or altered as shown from FIG. 2. Accordingly, the scope of the present disclosure should not be considered limited to the specific arrangements shown in FIG. 2.

FIG. 2 shows the system (200) that includes the repository (232), the computing system (202), and the client device (222), which may be embodiments of the computing system (1100) of FIG. 11.1, nodes (1122) and (1124), and client device (1126). The computing system (202) includes the training application (204) and the server application (206).

The training application (204) includes one or more programs that train the rich machine learning model (208) and the location based machine learning model (210) that are used by the server application (206). The training application (204) trains the models with training data from training wells. The training data from the training wells may include a threshold amount of production data (e.g., 24 months). The training application (204) may be controlled by a developer using the client device (222) with the client application (224).

The server application (206) includes one or more programs that use the rich machine learning model (208), the location based machine learning model (210), and the decline curve model (212) to generate predicted forecasts for regions. The regions may be specified by defining a geographical region that includes a region. The server application (206) may respond to requests from the client device (222) from a user to generate a forecast of production for a region. To generate the forecast, the server application (206) may identify the wells of a region and then identify the models to make predictions for the wells, and aggregate the predictions. The server application (206) may present the region wide forecast generated with the models using windows, text boxes, buttons, checkboxes, scroll bars, menus, etc.

The repository (232) is a computing system that may include multiple computing devices in accordance with the computing system (1100) and the nodes (1122) and (1124) described below in FIGS. 11.1 and 11.2. The repository (232) may be hosted by a cloud services provider for an E&P services provider. The cloud services provider may provide hosting, virtualization, and data storage services as well as other cloud services and the E&P services provider may operate and control the data, programs, and applications that store and retrieve data from the repository. The data in the repository (232) may include the training data used to train the models used by the system (200) and include the well data that is used to generate region wide forecasts of production.

The client device (222) is an embodiment of the computing system (1100) and the nodes (1122) and (1124) of FIG. 11.1 and FIG. 11.2. The client device (222) includes the client application (224) for accessing one or more of the training application (204) and the server application (206). The client application (224) may include multiple interfaces (e.g., a graphical user interface) for interacting with the training application (204) and the server application (206). A user may operate the client application (224) to control the training of the models or to generate a region wide forecast. The results may be presented by being displayed by the client device (222) in the client application (224). The user of the client device (222) may be a customer of the E&P services provider.

The client application (224) may be a web browser that access the training application (204) and the server application (206) using web pages hosted by the computing system (202). The client application (224) may additionally be a web services that communicate with the training application (204) and the server application (206) using a representational state transfer application programming interfaces (RESTful APIs). Although FIG. 2 shows a client server architecture, one or more parts of the training application (204) and the server application (206) may be a local applications on the client device (222) without departing from the claimed scope.

FIG. 3.1 and FIG. 3.2 show flowcharts of the process (300) and the process (320) in accordance with the disclosure. The process (300) generates production forecasts. The process (320) trains the machine learning models used by the system. The embodiments of FIGS. 3.1 and 3.2 may be combined and may include or be included within the features and embodiments described in the other figures of the application. The features of FIGS. 3.1 and 3.2 are, individually and as an ordered combination, improvements to the technology of computing systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 3.1, in Step 302, wells in a region are identified. The wells may be identified by accessing a database that identifies wells and locations and determining which wells are with the geographic boundary of the region. The region may be defined as a geographic boundary, which may include one or more regions.

In Step 304, a well is selected. The well may be selected from a list of wells identified in a region.

In Step 306, base data of a well data is identified. The base data is the well data that is available for a well. The base data may include location data that identifies the latitude and longitude of the well. The base data may also include extended data (also referred to as "rich data") that may include the lateral length and depth of the well and completion information for the well. The completion information may identify when the well was completed and the amount of proppant used in the well. The base data may also include production data for wells that have been completed and are producing. The production data may identify the amount of oil and gas produced from the well in barrels.

In Step 308, a well model is selected using the base data. The system may include three types of models: rich machine learning models, location based machine learning models, and decline curve models. The system may predict the production of a well on a month by month basis.

The rich machine learning models use extended data (also referred to as rich data) to predict the production of a well.

The location based machine learning models may use the location data (e.g., longitude and latitude) to predict the production of a well.

The rich machine learning models and the location based machine learning models may be used on wells that have less than a threshold amount of production data (e.g., less than 24 months of production data). The rich machine learning models and the location based machine learning models may include models for each month or may take the month to be predicted as an input to the model. The rich machine learning models and the location based machine learning models may use gradient boosted random forest algorithms or other random forest algorithms.

The decline curve models may be used for wells that have production data of a threshold number of months (e.g., 12, 18, 24, 30, or 36 months). The decline curve may predict future months of total production based on previous months of total production by fitting an exponential model to the previous months of total production and using the fitted exponential model to predict the future months of total production. Total production is the total number of barrels produced by a well.

The models used by the system may also be tuned. Model tuning may be done on a predetermined subset of the data. As an example, the tuning of tree based models may include: adjusting the maximum height of the decision trees, adjusting the number of trees in the model, setting a minimum number of wells, and adjusting randomization.

The maximum height of the decision trees may be adjusted. Increasing the maximum height of the decision trees may be done to increase the accuracy of the provided estimates. The maximum height may be decreased so that the predictions may generalize to new wells.

The number of trees in the model may be adjusted. More trees may give the model more predictive power. Fewer trees may be used to require less processing power and time. In some cases, too many trees, can lead to the model not generalizing well.

The minimum number of wells may be adjusted to tune the model. A minimum number of wells may be set that must be satisfied in order for a tree to create a new branch. The minimum number of wells prevents creating branches for outliers.

The randomization may be adjusted to tune the model. There may be multiple different ways that randomization works in a random forest model. For example, if each tree in the forest is given the same data, the trees developed by the algorithm may be identical. There are many different ways to introduce randomization so that the trees account for different patterns in the data. The randomization may be include sampling from the data and using different samples for different trees (e.g., sampling 50% of rows or 50% of columns for each tree).

In Step 310, a forecasted production is generated using the base data and the well model. Different models may be used for the same well depending on the length of a production forecast. For example, for the first two years of production, the rich machine learning model or location based machine learning model may be used, after which (e.g., at production month 25) the decline curve model is used to complete a production forecast.

When the base data includes production data for the rich machine learning model and an end date of the base data is before a threshold number of months (e.g., 36 months) of production, the rich machine learning model may be used to generate the forecasted production to the sooner of the threshold number of months of production and a forecast date. Thereafter, the decline curve model may be used to generate the forecasted production from the threshold number of months of production to the forecast date when the threshold number of months of production is less than the forecast date. The forecast date may be the farthest date in the future being forecast.

When the base data does not include production data and the end date of the base data is before the threshold number of months of production, the location based machine learning model may be used to generate the forecasted production to the sooner of the threshold number of months of production and the forecast date. Thereafter, the decline curve model may be used to generate the forecasted production from the threshold number of months of production to the forecast date when the threshold number of months of production is less than the forecast date.

When the base data has an end date after the threshold number of months of production, the decline curve model may be used to generate the forecasted production to the forecast date. The decline curve models may use less computing resources than the machine learning models. For mature wells with a sufficient amount of data (e.g., 24 months of production data), the machine learning models may not be used to reduce the amount of computing resources required to forecast the production of a well.

In particular, machine learning models are computationally expensive, but may be more accurate for less than a threshold number of months. After a number of months, the decline curve is approximately equally accurate, but less computationally expensive. Thus, one or more embodiments switch from using the machine learning model to the decline curve when forecasting more than a threshold number of months.

In Step 312, forecasted productions from different wells are aggregated to generate a region forecast. Each of the forecasted productions generated for each of the wells identified in the region may be aggregated by summing the monthly production of the individual wells. The aggregated forecasted production of the region may include monthly values for the total production of the region. The aggregated forecasted production may be generated on a periodic basis (e.g., daily, weekly, monthly, quarterly, etc.)

Turning to the training process shown in FIG. 3.2, in Step 322, training data is ingested from training wells. The training wells may be a subset of a plurality of wells for a plurality of regions. Ingesting the training data may include removing training data for wells that have less than a threshold number of months of production (e.g., 18, 24, or 36 months).

Ingesting the training data may also include removing training data for wells that include anomalous data patterns, including patterns that deviate from an exponential decline by a threshold amount. For example, the an exponential model may be fit to the production data. If the best fitting exponential model deviates from the production data by more than a threshold amount (e.g., 10%), then the corresponding well and well data may be removed form the training wells and training data. The deviation may be determined using the root mean square error, mean squared error, mean absolute error, etc.

In Step 324 rich machine learning models are trained. The rich machine learning models are trained with the training data from the training wells that includes rich data, which may be a subset of the training wells and training data.

In Step 326, the location based machine learning model is trained. The location based machine learning models are trained with the training data from the training wells that includes location data. Each of the training wells with sufficient duration of training data (e.g., at least 24 to 60 months) may include location data.

FIG. 4, FIG. 5, FIG. 6, FIG. 7, FIG. 8, FIG. 9, and FIG. 10 shows examples of systems, interfaces, and methods in accordance with the disclosure. The embodiments of FIG. 4, FIG. 5, FIG. 6, FIG. 7, FIG. 8, FIG. 9, and FIG. 10 may be combined and may include or be included within the features and embodiments described in the other figures of the application. The features and elements of FIG. 4, FIG. 5, FIG. 6, FIG. 7, FIG. 8, FIG. 9, and FIG. 10 are, individually and as a combination, improvements to the technology of computing systems. The various features, elements, widgets, components, and interfaces shown in FIG. 4, FIG. 5, FIG. 6, FIG. 7, FIG. 8, FIG. 9, and FIG. 10 may be omitted, repeated, combined, and/or altered as shown. Accordingly, the scope of the present disclosure should not be considered limited to the specific arrangements shown in FIG. 4, FIG. 5, FIG. 6, FIG. 7, FIG. 8, FIG. 9, and FIG. 10.

The functionality of programs of the system can be split into individual components, written as sub-sections below.

Data Ingestion:

The data is ingested from an exploration and production database, which may include data from multiple vendors and sources. The data from the sources are ingested through a data lake. A data lake is system or repository of data stored in its natural format including raw copies of source system data and transformed data, such as structured data from relational databases (rows and columns), semi-structured data (CSV, logs, WL, JSON), unstructured data (emails, documents, PDFs) and binary data (images, audio, video). The data from the exploration and production database is generally at least six months out, and the information which is six to nine months old may be unreliable. For this reason, a forecast may look more than six months ahead to predict beyond the current date. In addition, this delay increases the uncertainty of the forecast (relative to having up to date information). Additionally, a lot of the production in any future year may come from wells which are not completed by the start of that year. Therefore, it is helpful to have some idea of what wells will come online (e.g., by starting production), at least if the intention is to predict the total production of the combined assets—present and future—in an area. To get access to this information, the algorithm makes use of data (e.g., location data, time to completion data, etc.) on drilled uncompleted wells (DUCs) and permits (e.g., for wells that are not yet drilled). With the permits, the order and number of permits which will be actualized by drilling may be received as a user input and the algorithm will predict from that. These wells are horizontal wells (the majority of those being drilled in US land today). Vertical wells are dealt with separately (see Accumulating the Results below).

Pre-Processing:

The data is pre-processed prior to training the machine learning algorithms. The data may be any exploration and production information, including well information such as initial production amounts, lateral length, amount of proppant, drilled depth, and other completion parameters, the latitude and longitude of the well, etc. The data is pre-processed by data processing techniques that include dropping incomplete data, standardizing column names, encoding categorical variables, and removing wells with artificially stopped production.

The machine learning algorithms learn data patterns, and so if there are patterns in the data which do not represent the actual real world behavior of the well, then the algorithm may learn incorrect behaviors. Patterns do not represent the actual real world behavior may be detected by fitting an exponential model to the production data and determining whether the exponential model fits a threshold amount of error (e.g., 10%) to the data. Mean squared error (MSE) and mean absolute error (MAE) may be used to determine the error between the model and the data of a well.

One example of when data does not fit a pattern of real world behavior stems from well allocation, where multiple wells have their production recorded as a group and the individual well production is estimated as a fraction of the total production by engineers in the field. Sometimes these estimates are mistaken and result in corrections being issued later (often years later). These corrections result in unnatural data patterns (e.g., well production generally does not spike suddenly to compensate for bad allocation earlier). Another possibility is that a well is shut-down or data recording is discontinued, leading to unnatural flat production. Both these types are filtered out by a filter mechanism that measures how far a production curve deviates from a normal exponential decline (see FIG. 4). In addition, pre-processing includes removing missing variables and encoding categorical data.

Figure 5:
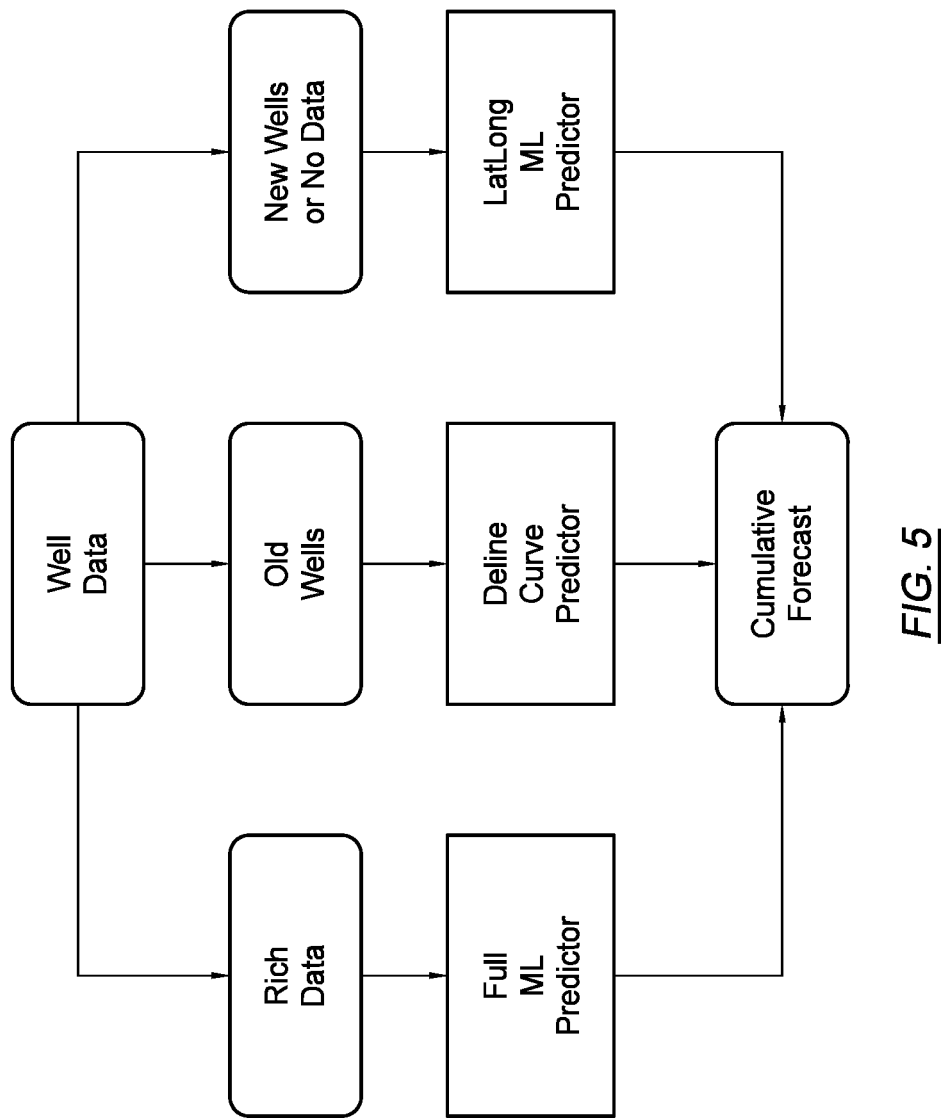

Data Splitting:

The data may be passed to different algorithms and is split based on what algorithm will make the prediction. The data may be split as shown in FIG. 5 and described here. 'Rich Data' is data with both location and completion information present (initial production can optionally be included). Old wells are wells which have enough production data that they exceed the range of the machine learning model (which is limited by the availability of historical data). In this case, the old wells are old enough (and so production is stable enough) that a traditional decline curve methods work well. If the well does not have any completion information or sufficient production information, it is treated as a well with location and production data. This is handled by the same model that handles wells with location data, which is the model that handles future wells.

Rich data may include location data, depth drilled, lateral length, proppant put down the well (e.g., the amount of fluid and sand pumped down), and the azimuth of the well. Many wells may have location data identified from well permits without other data.

Figure 6:
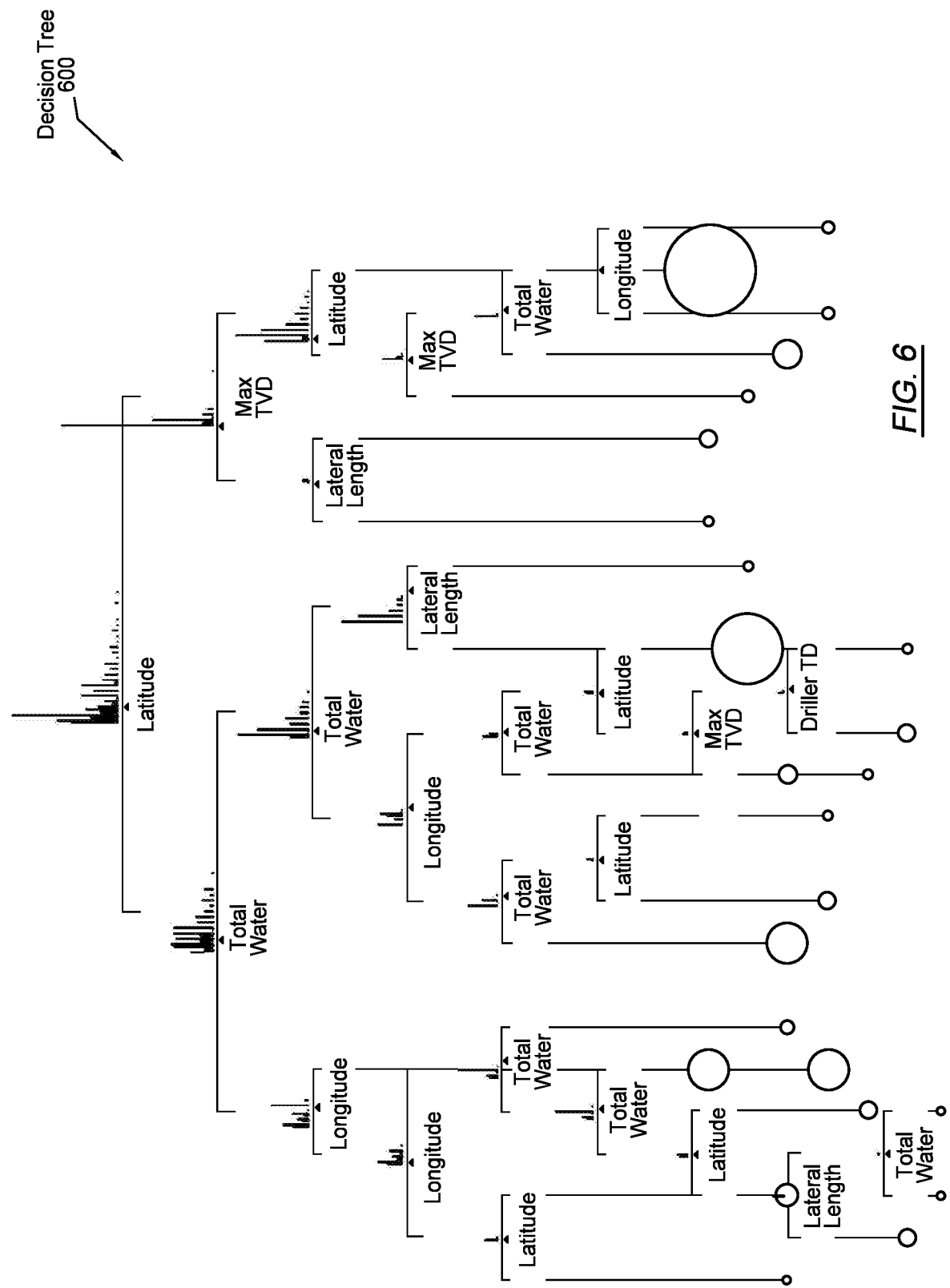

Rich Data Forecasting (Machine Learning):

A benefit of the forecasting using machine learning over traditional decline curve methods (besides being able to predict on thousands of wells in moments) is that machine learning methods can make use of context data to make better predictions. Wells that are data 'rich' contain a set of context data that the algorithm uses. The context data may include the location, lateral length, proppant and water used, mean azimuth, total vertical depth, total drilled depth, elevation, perforation interval length, number of frac stages, and oil price at production start. This information is used in a model called a gradient boosted regression (GBR) (or gradient boosted random forest) which uses an ensemble of decision trees to make an estimate. FIG. 6 shows a decision tree (600) that may be used. The model works by each ensemble of rules predicting the production rate of a given future month and then adding these production rates to create the cumulative production (see FIG. 6). For example, well information is preprocessed as discussed above to generate input data. The input data is fed into the ensemble of decision trees, which output a future estimate production rate. Each month of production may be predicted separately.

Figure 7:
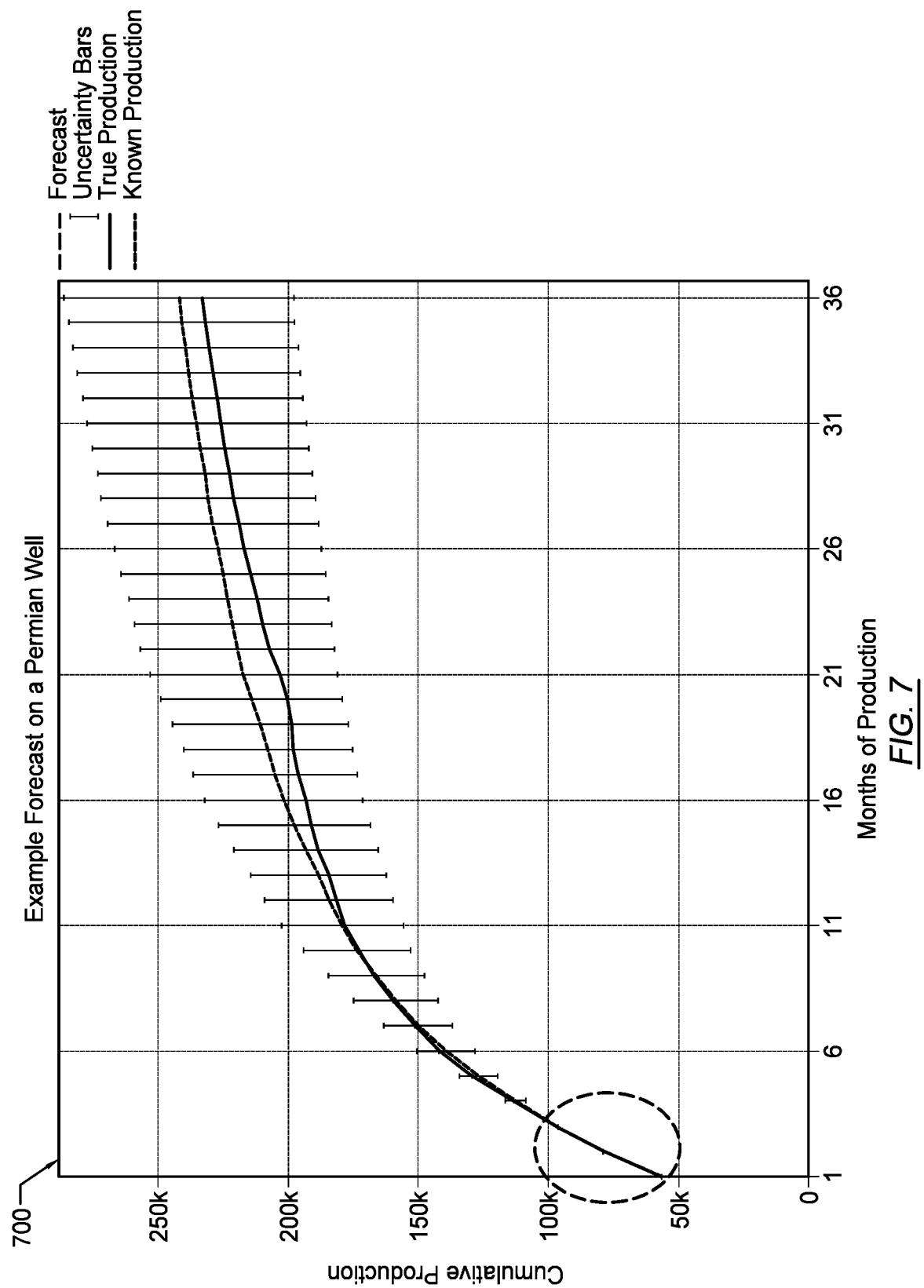
Figure 8:
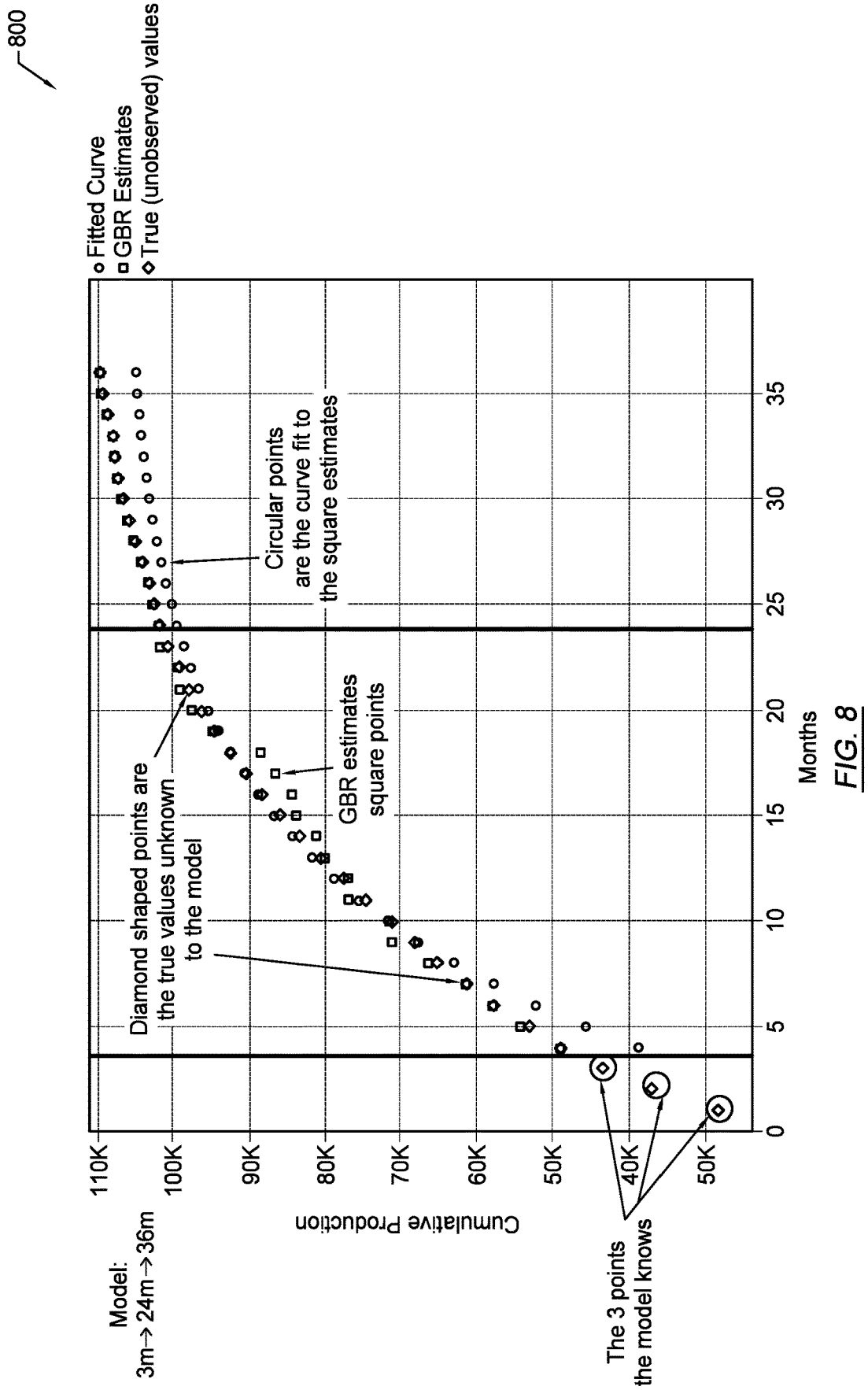

Using this method, the cumulative production of a well may be accurately predicted in the near future and into the far future, even with just a few initial months of production (see FIG. 7). FIG. 7 shows a graph (700) of example output of the embodiments disclosed herein.

Forecasting with Location and Initial Production (Machine Learning):

The same procedure can be used to forecast on the future wells and wells with little information. A difference is that these estimates include less context information and so are less accurate. For this forecast, location and any available initial production data is used.

Forecasting on Older Wells (Decline Curves):

Decline Curves are used for forecasting on older wells (e.g., wells with at least 24 months of production data). Production falls into a very predictable pattern after about two years and so the traditional decline curve methods can be used to generate predictions on these wells.

Extending Forecasts:

In some cases, predicting well production into the future, which is beyond the range of machine learning models and too recent for the use of decline curves, is desired. A hybrid method is employed in these cases that does the initial forecast using machine learning (e.g., with either a rich data model or a location based model) and then extends the initial forecast with decline curves. This method provides the benefits of using machine learning on the early part of the forecast, the first two to three years, and provides the indefinite range of a decline curve forecast. See FIG. 8 for a visual example (800) using a GBR machine learning model.

Future Well Handling:

As discussed above, a future well with a known location can be treated as a well with limited data and a location based machine learning model may be used. The future well is predicted with the same model as the model for handling wells with limited data. Additional considerations may be taken into account for future wells. Some future wells are drilled uncompleted wells. Drilled uncompleted wells have known locations, and it is estimated when they will be completed and brought online. This is done by estimating the number of wells being completed in the region from historical completion information. Different completion rates may be used to account for changes in available crews. Alternately, an estimate may be provided through a user interface for the number of wells that will be completed each month. Once the number is determined, the pool of drilled and uncompleted wells is sampled until no more are left. Similarly, for permits, the number of wells which are drilled each month may be estimated (or provided) by a subject matter expert. With this number and the number of wells completed each month, the permits may be sampled to get wells which are likely to come online in each given month. Predicting using these wells creates a better forecast of the future production of the region. These predictions may be revised as the wells come online.

Figure 9:
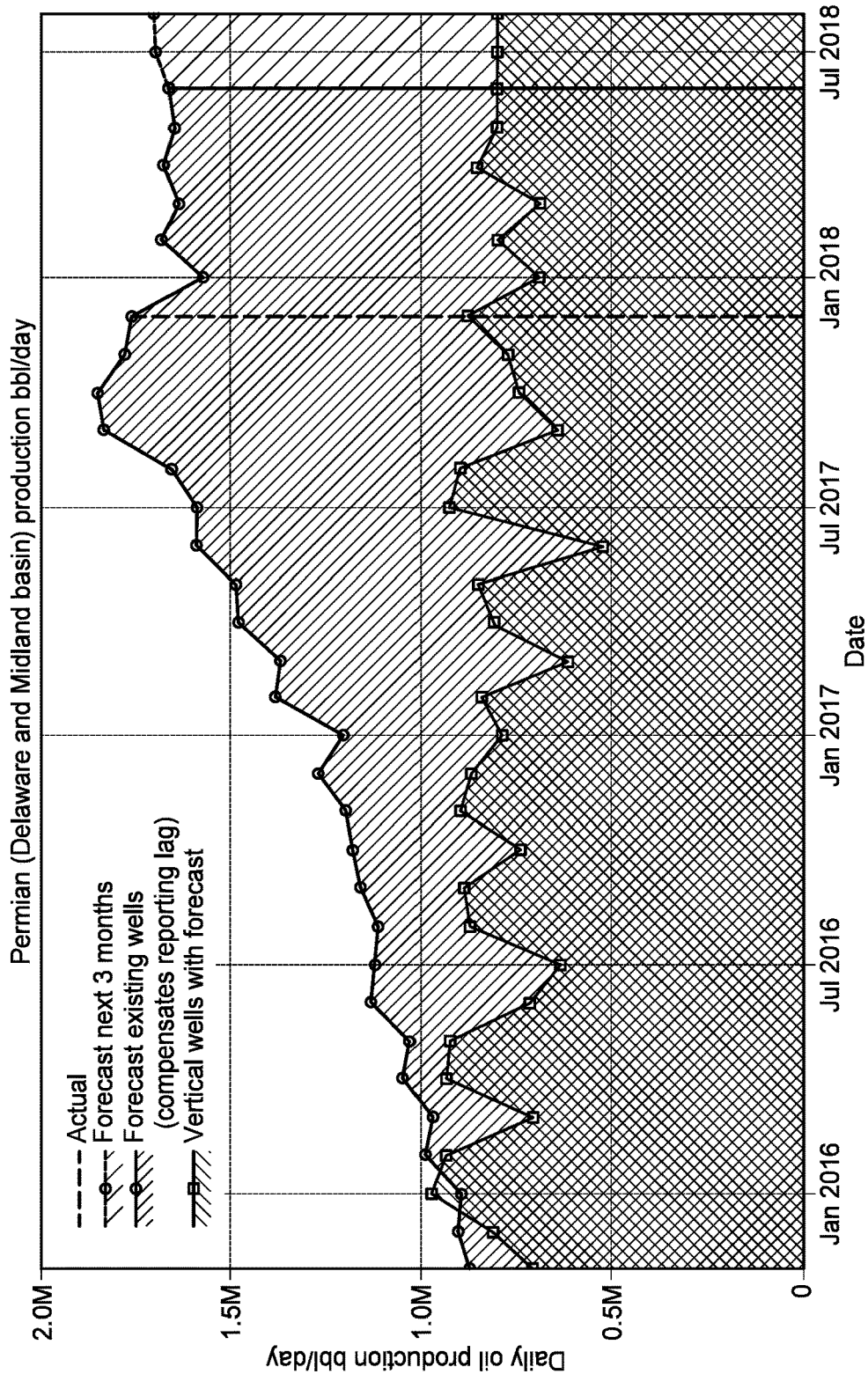

Accumulating the Results:

Getting a cumulative total is performed by adding the results of each individual well together to create the total. A minor complication is the presence of vertical wells which are not dealt with by the above pipeline. Vertical wells have more predictable behavior and may modeled with curve fitting. The result is a future estimate for a large set of wells for both horizontal and vertical wells (see FIG. 9 for an example). FIG. 9 shows a graph (900) with the date on the horizontal axis and daily oil production in barrels per day on the vertical axis.

Figure 10:
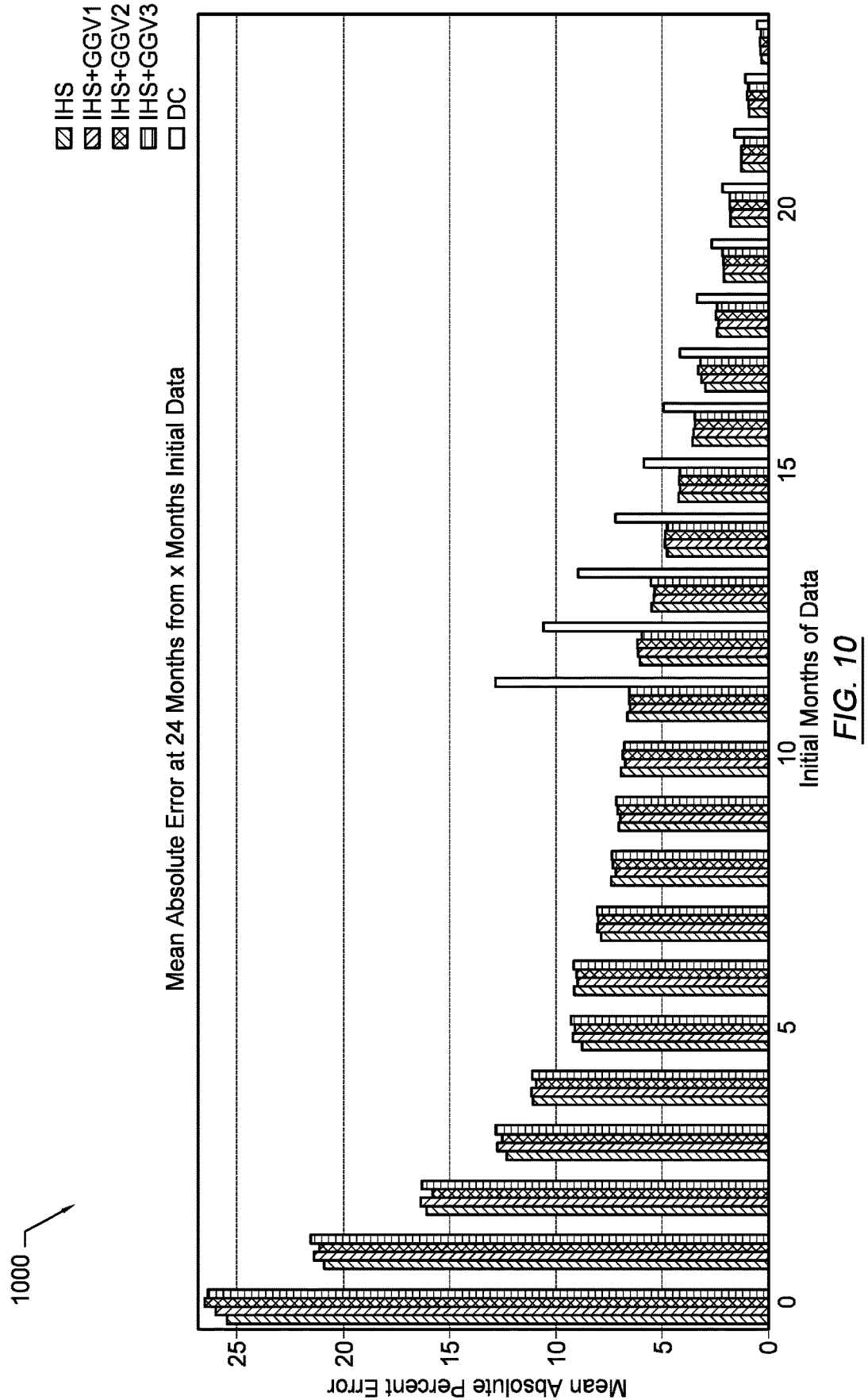

Evaluation:

A brief visual of comparison of the method to decline curves is included in FIG. 10. In FIG. 10, different decline curves are shown on graph (1000). In the graph (1000), the horizontal axis is the initial months of data and the vertical axis is the mean absolute percent error. Note the IHS and IHS+ methods are variations on the machine learning method and the DC method is an automated decline curve solution. Lower is better (the graph measures error). The DC curve was not extended fully back as it is unstable for less than 12 months of initial data. A graphical user interface may be used to interactively select, execute, and compare the different versions and methods described above.

Embodiments may be implemented on a computing system. Any combination of mobile, desktop, server, router, switch, embedded device, or other types of hardware may be used. For example, as shown in FIG. 11.1, the computing system (1100) may include one or more computer processors (1102), non-persistent storage (1104) (e.g., volatile memory, such as random access memory (RAM), cache memory), persistent storage (1106) (e.g., a hard disk, an optical drive such as a compact disk (CD) drive or digital versatile disk (DVD) drive, a flash memory, etc.), a communication interface (1112) (e.g., Bluetooth interface, infrared interface, network interface, optical interface, etc.), and numerous other elements and functionalities.

The computer processor(s) (1102) may be an integrated circuit for processing instructions. For example, the computer processor(s) may be one or more cores or micro-cores of a processor. The computing system (1100) may also include one or more input devices (1110), such as a touchscreen, keyboard, mouse, microphone, touchpad, electronic pen, or any other type of input device.

The communication interface (1112) may include an integrated circuit for connecting the computing system (1100) to a network (not shown) (e.g., a local area network (LAN), a wide area network (WAN) such as the Internet, mobile network, or any other type of network) and/or to another device, such as another computing device.

Further, the computing system (1100) may include one or more output devices (1108), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1102), non-persistent storage (1104), and persistent storage (1106). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (1100) in FIG. 11.1 may be connected to or be a part of a network. For example, as shown in FIG. 11.2, the network (1120) may include multiple nodes (e.g., node X (1122), node Y (1124)). Nodes may correspond to a computing system, such as the computing system shown in FIG. 11.1, or a group of nodes combined may correspond to the computing system shown in FIG. 11.1. By way of an example, embodiments of the disclosure may be implemented on a node of a distributed system that is connected to other nodes. By way of another example, embodiments of the disclosure may be implemented on a distributed computing system having multiple nodes, where portions of the disclosure may be located on a different node within the distributed computing system. Further, one or more elements of the aforementioned computing system (1100) may be located at a remote location and connected to the other elements over a network.

Although not shown in FIG. 11.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1122), node Y (1124)) in the network (1120) may be configured to provide services for a client device (1126). For example, the nodes may be part of a cloud computing system. The nodes may include functionality to receive requests from the client device (1126) and transmit responses to the client device (1126). The client device (1126) may be a computing system, such as the computing system shown in FIG. 11.1. Further, the client device (1126) may include and/or perform at least a portion of one or more embodiments of the disclosure.

The computing system or group of computing systems described in FIGS. 11.1 and 11.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 11.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where tokens may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 11.1, while performing one or more embodiments of the disclosure, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 11.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 11.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 11.1 and the nodes and/or client device in FIG. 11.2. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure.

What is claimed is:

1. A method comprising:
identifying base data of a well in a plurality of wells of a region;
selecting, using the base data and from a set of a models comprising a rich machine learning model, a location based machine learning model, and a decline curve model, a well model;
generating, based on the selecting, a forecasted production of the well using the base data and the well model;
aggregating a plurality of forecasted productions of the plurality of wells, the plurality of forecasted productions including the forecasted production, to generate a region forecast by applying each of the rich machine learning model, the location based machine learning model, and the decline curve model to the base data; and
using the region forecast to perform a field operation.

2. The method of claim 1, further comprising:
generating the forecasted production of the well by:
when the base data includes production data for the rich machine learning model and an end date of the base data is before a threshold number of months of production, using the rich machine learning model to generate the forecasted production to the threshold number of months of production, and then using the decline curve model to generate the forecasted production from the threshold number of months of production to a forecast date.

3. The method of claim 1, further comprising:
generating the forecasted production of the well by:
when the base data does not include production data and end date of the base data is before a threshold number of months of production, using the location based machine learning model to generate the forecasted production to the threshold number of months of production, and then using the decline curve model to generate the forecasted production from the threshold number of months of production to a forecast date.

4. The method of claim 1, further comprising:
generating the forecasted production of the well by:
when the base data has an end date after a threshold number of months of production, using the decline curve model to generate the forecasted production to a forecast date.

5. The method of claim 1, wherein the rich machine learning model uses one of a gradient boosted random forest algorithm and a random forest algorithm.

6. The method of claim 1, wherein the location based machine learning model uses one of a gradient boosted random forest algorithm and a random forest algorithm.

7. The method of claim 1, further comprising:
ingesting training data of a plurality of training wells of a target region;
training the rich machine learning model on the training data, the training data comprising rich data from wells in the target region; and
training the location based machine learning model with the training data.

8. The method of claim 7,
wherein ingesting the training data further comprises:
removing training data for wells that have less than a threshold number of months of production; and
removing training data for wells that include anomalous data patterns, including patterns that deviate from an exponential decline by a threshold amount.

9. A server system comprising:
a processor;
a memory coupled to the processor; and
the memory comprising an application that executes on the processor, uses the memory, and is configured for:
identifying base data of a well in a plurality of wells of a region;
selecting, using the base data and from a set of a models comprising a rich machine learning model, a location based machine learning model, and a decline curve model, a well model;
generating, based on the selecting, a forecasted production of the well using the base data and the well model;
aggregating a plurality of forecasted productions of the plurality of wells, the plurality of forecasted productions including the forecasted production, to generate a region forecast by applying each of the rich machine learning model, the location based machine learning model, and the decline curve model to the base data; and
using the region forecast to perform a field operation.

10. The server system of claim 9, wherein the application is further configured for:
generating the forecasted production of the well by:
when the base data includes production data for the rich machine learning model and an end date of the base data is before a threshold number of months of production, using the rich machine learning model to generate the forecasted production to the threshold number of months of production, and then using the decline curve model to generate the forecasted production from the threshold number of months of production to a forecast date.

11. The server system of claim 9, wherein the application is further configured for:
generating the forecasted production of the well by:
when the base data does not include production data and an end date of the base data is before a threshold number of months of production, using the location based machine learning model to generate the forecasted production to the threshold number of months of production, and then using the decline curve model to generate the forecasted production from the threshold number of months of production to a forecast date.

12. The server system of claim 9, wherein the application is further configured for:
generating the forecasted production of the well by:
when the base data has an end date after a threshold number of months of production, using the decline curve model to generate the forecasted production to a forecast date.

13. The server system of claim 9, wherein the rich machine learning model uses one of a gradient boosted random forest algorithm and a random forest algorithm.

14. The server system of claim 9, wherein the location based machine learning model uses one of a gradient boosted random forest algorithm and a random forest algorithm.

15. The server system of claim 9, wherein the application is further configured for:

ingesting training data of a plurality of training wells of a target region;

training the rich machine learning model on the training data, the training data comprising rich data from wells in the target region; and training the location based machine learning model with the training data.

16. The server system of claim 15, wherein ingesting the training data further comprises:

removing training data for wells that have less than a threshold number of months of production; and removing training data for wells that include anomalous data patterns, including patterns that deviate from an exponential decline by a threshold amount.

17. One or more non-transitory computer readable mediums comprising computer readable program code for:

identifying base data of a well in a plurality of wells of a region;

selecting, using the base data and from a set of a models comprising a rich machine learning model, a location based machine learning model, and a decline curve model, a well model;

generating, based on the selecting, a forecasted production of the well using the base data and the well model;

aggregating a plurality of forecasted productions of the plurality of wells, the plurality of forecasted productions including the forecasted production, to generate a region forecast by applying each of the rich machine learning model, the location based machine learning model, and the decline curve model to the base data; and using the region forecast to perform a field operation.

18. The one or more non-transitory computer readable mediums of claim 17, further comprising computer readable program code for:

generating the forecasted production of the well by:

when the base data includes production data for the rich machine learning model and an end date of the base data is before a threshold number of months of production, using the rich machine learning model to generate the forecasted production to the threshold number of months of production, and then using the decline curve model to generate the forecasted production from the threshold number of months of production to a forecast date.

19. The one or more non-transitory computer readable mediums of claim 17, further comprising computer readable program code for:

generating the forecasted production of the well by:

when the base data does not include production data and an end date of the base data is before a threshold number of months of production, using the location based machine learning model to generate the forecasted production to the threshold number of months of production, and then using the decline curve model to generate the forecasted production from the threshold number of months of production to a forecast date.

20. The one or more non-transitory computer readable mediums of claim 17, further comprising computer readable program code for:

generating the forecasted production of the well by:

when the base data has an end date after a threshold number of months of production, using the decline curve model to generate the forecasted production to a forecast date.

* * * * *